(12) United States Patent
Kakehi et al.

(10) Patent No.: US 8,171,532 B2
(45) Date of Patent: May 1, 2012

(54) MANAGEMENT APPARATUS, MANAGEMENT METHOD AND RECORDING MEDIUM STORING PROGRAM

(75) Inventors: Rumiko Kakehi, Tokyo (JP); Toshikatsu Suzuki, Tokyo (JP)

(73) Assignee: Fuji Xerox Co., Ltd, Tokyo (JP)

( * ) Notice: Subject to any disclaimer, the term of this patent is extended or adjusted under 35 U.S.C. 154(b) by 984 days.

(21) Appl. No.: 12/124,526

(22) Filed: May 21, 2008

(65) Prior Publication Data

US 2009/0055926 A1 Feb. 26, 2009

(30) Foreign Application Priority Data

Aug. 22, 2007 (JP) ................................. 2007-216115

(51) Int. Cl.
*G06F 21/00* (2006.01)
(52) U.S. Cl. ............ 726/6; 715/229; 713/165; 709/206; 726/2
(58) Field of Classification Search ........................ 726/6
See application file for complete search history.

(56) References Cited

U.S. PATENT DOCUMENTS

| | | | |
|---|---|---|---|
| 7,155,502 B1 * | 12/2006 | Galloway et al. | 709/223 |
| 7,853,986 B2 * | 12/2010 | Watanabe | 726/2 |
| 2004/0079800 A1 * | 4/2004 | Sugino et al. | 235/436 |
| 2004/0267889 A1 * | 12/2004 | Graham et al. | 709/206 |
| 2005/0039000 A1 * | 2/2005 | Erickson | 713/165 |
| 2005/0097441 A1 * | 5/2005 | Herbach et al. | 715/501.1 |
| 2007/0180519 A1 * | 8/2007 | Boccon-Gibod et al. | 726/21 |
| 2008/0115225 A1 * | 5/2008 | Jogand-Coulomb et al. | 726/27 |
| 2008/0184348 A1 * | 7/2008 | Tanaka | 726/6 |
| 2009/0019360 A1 * | 1/2009 | Lynggaard et al. | 715/243 |

FOREIGN PATENT DOCUMENTS

| | | |
|---|---|---|
| JP | A 2006-293486 | 10/2006 |
| JP | A-2006-323720 | 11/2006 |
| JP | A-2007-018301 | 1/2007 |
| JP | A-2007-072639 | 3/2007 |
| JP | A-2007-095034 | 4/2007 |
| JP | A-2007-199959 | 8/2007 |

OTHER PUBLICATIONS

Physical Access Control with BACnet|http://www.bacnet.org/Bibliography/BAC-09-08.pdf|Bernhard Isler,Hans-Joachim Mundt, Rob Zivney,| pp. 1-124|2008.*

Office Action mailed on Jan. 10, 2012 in corresponding Japanese Patent Application No. 2007-216115. (with English language translation).

* cited by examiner

*Primary Examiner* — Taghi Arani
*Assistant Examiner* — Mahfuzur Rahman
(74) *Attorney, Agent, or Firm* — Oliff & Berridge, PLC

(57) ABSTRACT

A management apparatus which includes: a receiving unit that receives first authorization information for a first document that is already issued and contains document identification information identifying at least one document for which it is possible to issue authorization information and an issuance request requesting that second authorization information for a second document be issued; a verifying unit that verifies authenticity of the first authorization information that is received by the receiving unit; a checking unit that, in a case where the authenticity of the first authorization information is verified, checks whether or not document identification information identifying the second document is included in the first authorization information; and an issuing unit that, in a case where the document identification information identifying the second document is included in the first authorization information, issues the second authorization information.

9 Claims, 8 Drawing Sheets

| APPLIED POLICY | DOCUMENT ID | USE RANGE | VALIDITY PERIOD | PERMITTED OPERATION FUNCTIONS | LICENSE ISSUABLE DOCUMENT IDs |
|---|---|---|---|---|---|
| Policy 1 | Doc ID1 | USER ID : 12345 | 2007.3.1-2007.3.2 | VIEWING, EDITING, PRINTING | Doc ID2, Doc ID3 |
| | | USER ID : 67890 | 2007.4.1-2007.4.1 | VIEWING | Doc ID2, Doc ID3 |
| Policy 2 | Doc ID2 | NAME OF ORGANIZATION TO WHICH USER BELONGS : SYSTEM DEVELOPMENT DEPARTMENT | 2007.3.1-2007.4.30 | VIEWING, PRINTING | Doc ID4 |
| | | USER ID : 13579 | 2007.3.1-2007.3.30 | VIEWING, EDITING, PRINTING | Doc ID4 |
| ... | ... | ... | ... | ... | ... |

| APPLIED POLICY | DOCUMENT ID | USE RANGE | VALIDITY PERIOD | PERMITTED OPERATION FUNCTIONS |
| --- | --- | --- | --- | --- |
| Policy 1 | Doc ID1 | USER ID : 12345 | 2007.3.1-2007.3.2 | VIEWING, EDITING, PRINTING |
| | | USER ID : 67890 | 2007.4.1-2007.4.1 | VIEWING |
| Policy 2 | Doc ID2 | NAME OF ORGANIZATION TO WHICH USER BELONGS : SYSTEM DEVELOPMENT DEPARTMENT | 2007.3.1-2007.4.30 | VIEWING, PRINTING |
| | | USER ID : 13579 | 2007.3.1-2007.3.30 | VIEWING, EDITING, PRINTING |
| Policy X | temporary | ALL USERS | UNLIMITED | VIEWING |
| ... | ... | ... | ... | ... |

MANAGEMENT APPARATUS, MANAGEMENT METHOD AND RECORDING MEDIUM STORING PROGRAM

CROSS-REFERENCE TO RELATED APPLICATION

This application is based on and claims priority under 35 USC 119 from Japanese Patent Application No. 2007-216115 filed on Aug. 22, 2007.

BACKGROUND

1. Technical Field

The present invention relates to a management apparatus, a management method and a recording medium storing a program.

2. Related Art

In the case where an electronic document has an access restriction (also called an "operation restriction") for the purpose of preventing information leakage and unauthorized accesses, it is necessary to authenticate an operating person or an operating apparatus to access the electronic document.

However, in the case where the use environment of the document changes or where a process having urgency needs to be performed, there is a possibility that an exceptional situation may arise in which it is necessary to perform an operation that is not permitted. In such a situation, a method is used by which the access restriction is temporarily cancelled or the contents of the restriction is mitigated.

SUMMARY

An aspect of the present invention provides a management apparatus which includes: a receiving unit that receives first authorization information for a first document that is already issued and contains document identification information identifying at least one document for which it is possible to issue authorization information and an issuance request requesting that second authorization information for a second document be issued; a verifying unit that verifies authenticity of the first authorization information that is received by the receiving unit; a checking unit that, in a case where the authenticity of the first authorization information is verified, checks whether or not document identification information identifying the second document is included in the first authorization information; and an issuing unit that, in a case where the document identification information identifying the second document is included in the first authorization information, issues the second authorization information.

BRIEF DESCRIPTION OF THE DRAWINGS

Exemplary embodiments of the present invention will be described in detail based on the following figures, wherein:

FIG. 3 is a drawing showing an example of a policy setting table managed in the information storing unit shown in FIG. 1;

FIG. 7 is a drawing of another example of a policy setting table; and

DETAILED DESCRIPTION

Exemplary embodiments of a management apparatus, a management method and a recording medium storing a program according to the present invention will be explained in detail with reference to the accompanying drawings.

FIRST EXAMPLE

Figure 1:
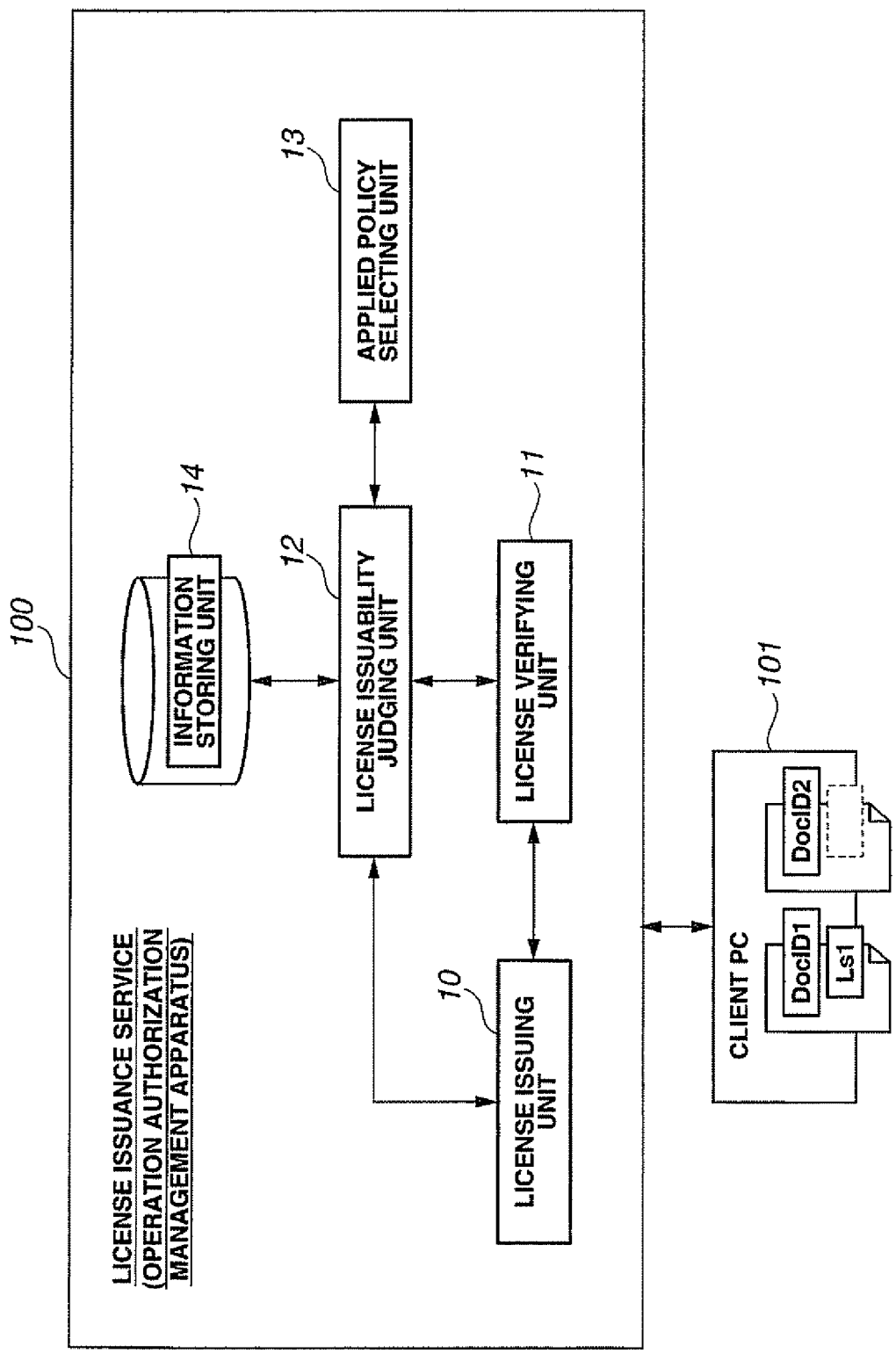
FIG. 1 is an example of a system configuration diagram of a document operating system that is configured by applying a management apparatus, a management method and a recording medium storing a program according to the exemplary embodiment of the present invention.

FIG. 1 is an example of a system configuration diagram of a document operating system that is configured by applying a management apparatus, a management method and a recording medium storing a program according to the exemplary embodiment of the present invention.

In FIG. 1, the document operating system includes a management apparatus 100 (hereinafter, a "processing server 100") and a document operating apparatus 101 (hereinafter, a "client PC 101").

The document operation system is a system in which, by issuing authorization information (hereinafter a "license") permitting a predetermined operation based on a security policy to an electronic document (hereinafter a "document"), which is electronic information, the operation on the document permitted by the license becomes possible.

The security policy (hereinafter, "policy information") is kept in correspondence with the document and describes, for example, which user is able to perform what operation during what period of time.

The license permits a part or all of the operations to which an operation restriction is applied by the policy information. More specifically, the license specifies an authorization to perform certain operations on the document.

The client PC 101 stores therein one or more documents and performs various types of operations such as "viewing, editing, printing, and changing attributes" on each of the stored documents. When performing one or more of these operations, the client PC 101 issues a license issuance request to the processing server 100, requesting that a license be issued for the document being the target of the operations. The client PC 100 is able to perform operations on the document within a range of operations that are permitted by the license issued by the processing server 100.

It may be possible to employ a configuration in which the license issuance request contains the contents of the operations that are requested to be permitted. If the license is not issued, it is not possible to perform operations on the document. It should be noted that, for a document for which a license is already issued, it is possible to perform the operations on the document based on the contents of the license.

In First Example, the license includes at least four elements: operation permitted for the document that the target of the license; a validity period for the permitted operations; a list of documents whose licenses can be newly issued; and the document that is the target of the license. An example of a license that is configured with these elements is shown in FIG. 2.

Figure 2:
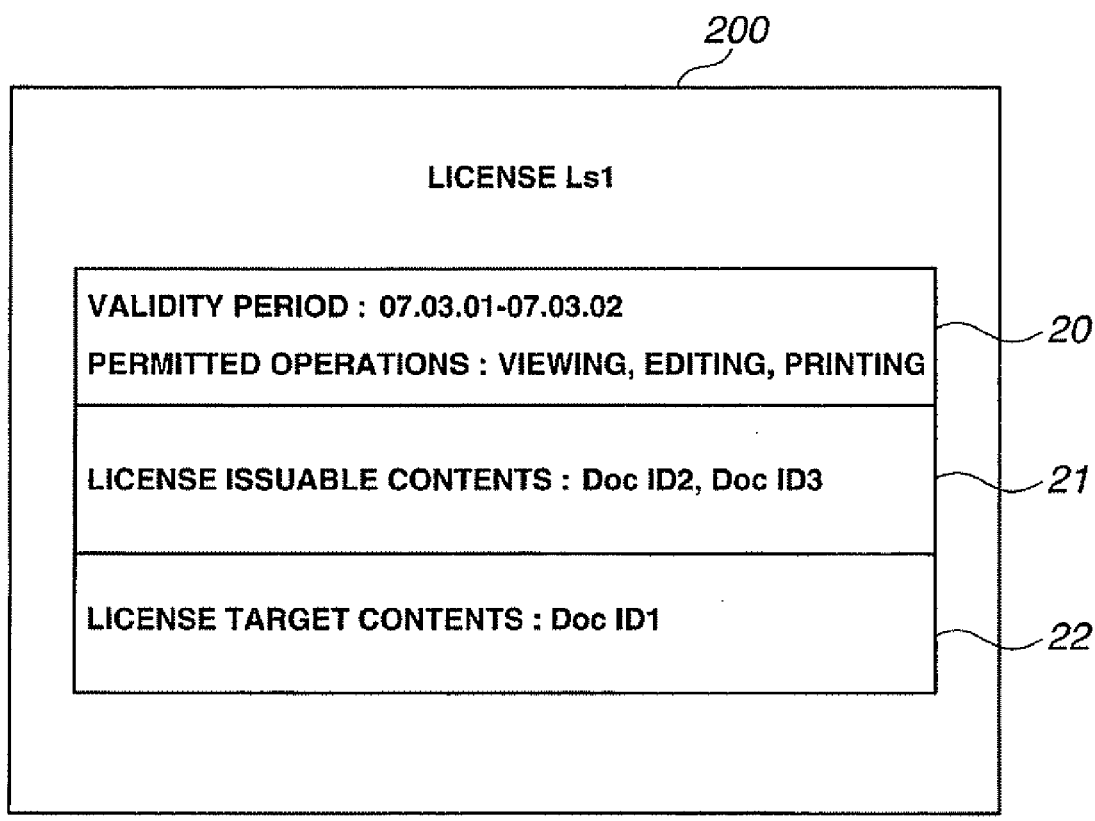
FIG. 2 is a drawing showing a configuration of a license used in the document operating system according to the exemplary embodiment of the present invention.

A license 200 shown in FIG. 2 is named "License Ls1" and includes: operation information 20 that is made up of a validity period item and a permitted operation item; a license issuable contents item 21 that is an item specifying one or more other documents whose license can be newly issued; and a license target contents item 22 that indicates the document that is the target of the license.

In the license 200 shown in FIG. 2, "07.03.01-07.03.02" is shown as the validity period item included in the operation information 20. "Viewing, Editing, Printing" is indicated as the permitted operation item. "Doc ID2, Doc ID3" is shown as the license issuable contents item 21. Also, "Doc ID1" is shown as the license target contents item 22.

It means that the validity period of the document identified with "Doc ID1" to which the license named "License LS1" is issued is from the 1st of March, 2007 to the 2nd of March, 2007 as indicated by "07.03.01-07.03.02", and the operations of viewing, editing, and printing are permitted, as indicated by "Viewing, Editing, Printing", Also, it is shown that it is possible to newly issue a license for each of the documents identified with "Doc ID2" and "Doc ID3". In the following explanation, the information represented with "Doc ID" used for identifying each document will be referred to as a "document ID".

In order to issue a license to a document for which the license is not yet issued and make it temporarily possible to perform operations on the document, the client PC 101 transmits, to the processing server 100, a license issuance request containing another license that is already issued for another document and allows operations to be performed thereon and a document ID of the document for which the license is not yet issued and issuance of the new license is requested, together with a user ID of the user who is making the request.

The processing server 100 includes a license issuing unit 10, a license verifying unit 11, a license issuability judging unit 12, an applied policy selecting unit 13, and an information storing unit 14. The processing server 100 manages pieces of policy information that are respectively specified for the documents in correspondence with the document IDs of the documents. In addition, the processing server 100 performs a license issuing process.

When the client PC 101 transmits the license issuance request, the license issuing unit 10 included in the processing server 100 receives the license issuance request. Upon receiving the license issuance request, the license issuing unit 10 forwards the license issuance request to the license verifying unit 11.

First, the license verifying unit 11 analyzes the license issuance request and takes out the license. Subsequently, the license verifying unit 11 verifies the license to check to see if the license taken out is an authentic license.

For example, in order to perform the verifying process on the license, the following methods may be used: checking to see if the license has a predetermined format; checking to see if the processing server 100 manages the same license as the license taken out; checking to see if the license is issued for the user who is a source of the transmission; checking to see if the validity period is not expired; and checking to see if the license contains a signature that is provided by the processing server 100.

In each of these methods, it is judged that the license is an authentic license if the license has the predetermined format, the processing server 100 manages the same license, the license is issued for the user who is the source of the transmission of the request, the validity period is not expired; or the signature is successfully verified.

When judging that the license is not an authentic license, the license verifying unit 11 notifies the judgment result to the license issuing unit 10. The license issuing unit 10 transmits, to the client PC 101, a message indicating that it is not possible to issue the license, and the process is ended.

If the authenticity of the license is verified, the license verifying unit 11 transmits the verification result to the license issuing unit 10 and to the license issuability judging unit 12. Upon receiving the verification result, the license issuing unit 10 transmits the license issuance request received from the client PC 101 to the license issuability judging unit 12.

Upon receiving the license issuance request from the license issuing unit 10 and receiving the verification result showing that the authenticity of the license is verified from the license verifying unit 11, the license issuability judging unit 12 judges whether or not a license is newly issued for the document identified with the document ID and is the target of the license issuance request.

In this judgment process, first, the license issuability judging unit 12 judges whether or not the license issuable contents item (e.g., "the license issuable contents item 21" in the example shown in FIG. 2) of the license contained in the license issuance request includes the document ID of the document for which issuance of the license is requested.

When judging that the document ID is contained, the license issuability judging unit 12 judges that it is possible to issue the license. The license issuability judging unit 12 then identifies the one of the pieces of policy information corresponding to the document identified with the document ID and the one of the pieces of policy information corresponding to the document for which the license contained in the license issuance request is already issued, out of a policy setting table managed in the information storing unit 14.

Subsequently, of the two pieces of policy information that is identified out of the policy setting table, the piece of policy information having the higher degree of operation restriction (i.e., having the higher level of security) is selected. After that, the one or more operations permitted by the selected piece of policy information are specified and transmitted to the license issuing unit 10.

Accordingly, the license issuing unit 10 determines the contents of the license to be issued based on the received piece of policy information and issues the license.

As explained above, when the license issuability judging unit 12 judges the issuability of the license and judges that it is possible to issue the license, the license issuability judging unit 12 transmits the judgment result to the license issuing unit 10. Accordingly, the license issuing unit 10 issues the license for the document to the client PC 101 being the source of the license issuance request.

As for the license issued as described above, as shown in FIG. 8, the information storing unit 14 manages a license ID in correspondence with each user and each apparatus being the source of the request. In other words, the license is issued to the corresponding apparatus while the user and the apparatus being the source of the request (i.e., the client PC) are identified.

Figure 8:
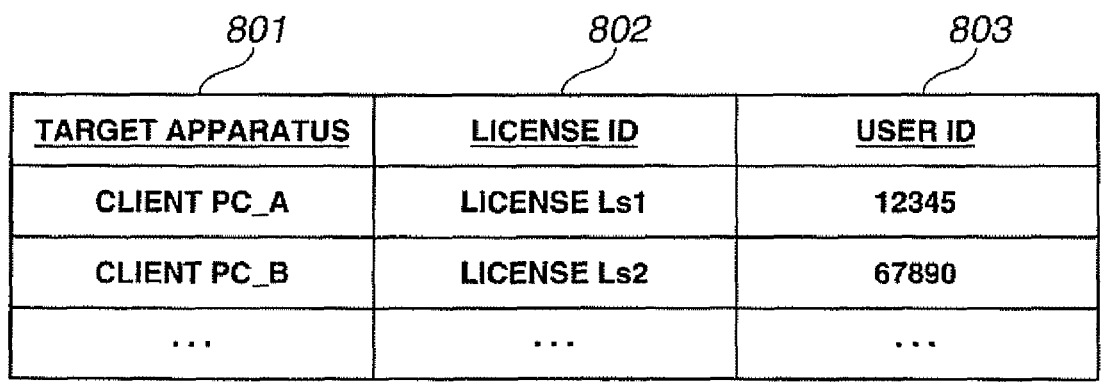
FIG. 8 is a drawing showing a configuration of a table in which a license to be issued is specified for each of the apparatuses being the source of a license issuance request.

FIG. 8 includes [target apparatus] item 801 each indicating a piece of apparatus identification information used for identifying the apparatus being the source of the license issuance request; [license ID] item 802 each indicating a piece of license identification information used for identifying the issued license; and user IDs 803 each identifying the user being the source of the license issuance request.

FIG. 3 is a drawing that shows an example of the policy setting table managed in the information storing unit shown in FIG. 1.

FIG. 3 is an example of the policy setting table showing pieces of policy information that is respectively set for the documents identified with a document ID. The policy setting table is formed by [policy ID] item 301, [document ID] item 302, [use range] item 303, [validity period] item 304, [permitted operation functions] item 305, and [license issuable document ID] item 306. The [policy ID] item 301 indicates a policy ID used for identifying a piece of policy information. The [document ID] item 302 indicates a document ID used for identifying the document to which the piece of policy information is applied. The [use range] item 303 indicates an organizational department name or a user ID to which the piece of policy information is applied. The [validity period] item 304 indicates a validity period of the piece of policy information set for each of the organizational department or the user. The [permitted operation functions] item 305 indicates one or more operation functions permitted for each of the organizational department or the user. The [license issuable document ID] item 306 indicates document IDs of license issuable documents that are described in a license as being license issuable at the time of issuing the license of the document of the document ID as indicated in the "document ID" item 302.

Figure 4:
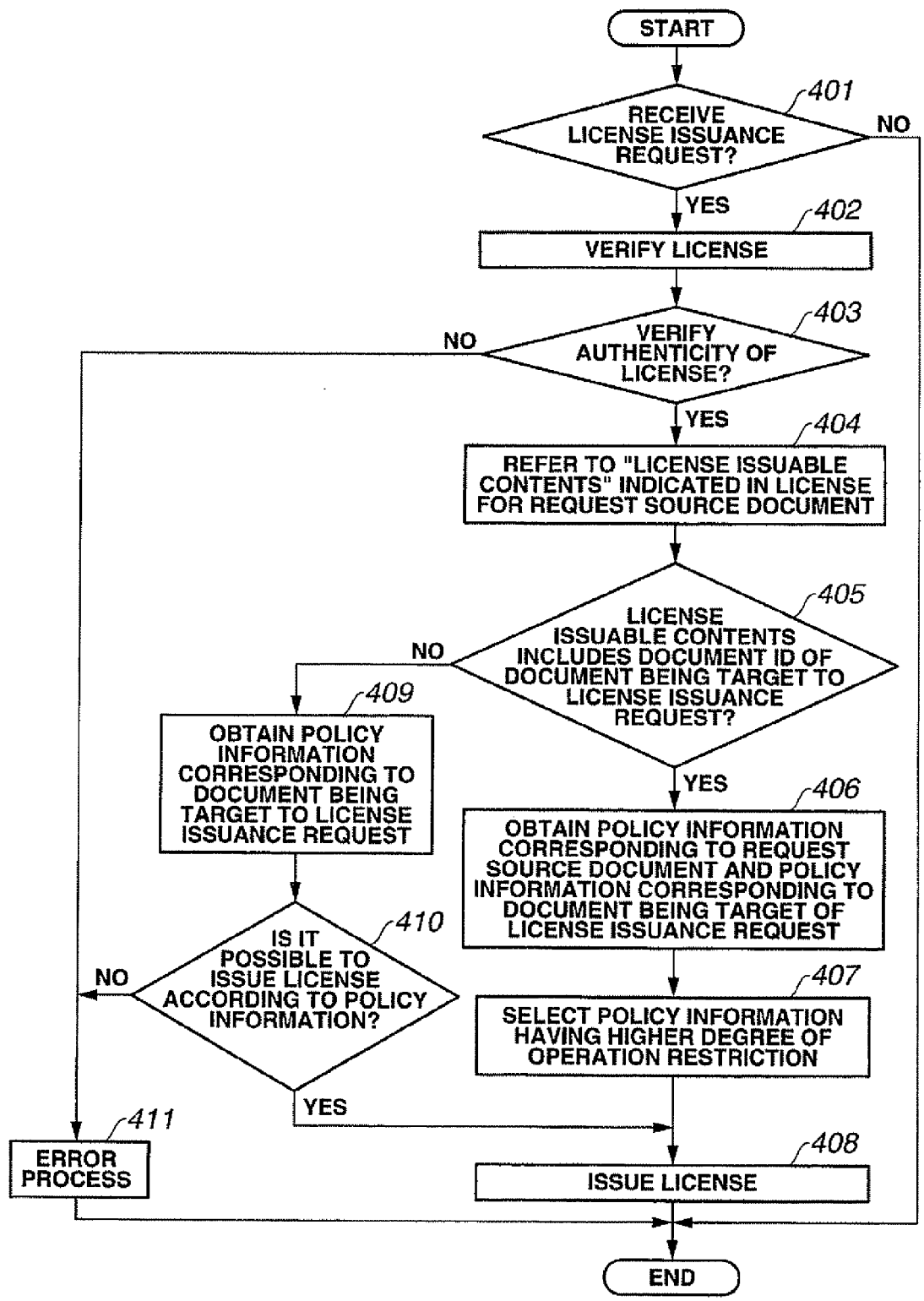
FIG. 4 is a flowchart showing an example of a flow in a process performed by the management apparatus according to the exemplary embodiment of the present invention.

FIG. 4 is an example of a flowchart that shows a flow in the process performed by a permission information management apparatus according to the exemplary embodiment of the present invention.

As shown in FIG. 4, when a processing request is received from a client PC, the process is started. It is judged whether or not the received processing request is a license issuance request for a document (401). If the received processing request is not a license issuance request (401: No), the process is ended. On the contrary, if the received processing request is a license issuance request (401: Yes), authenticity of the license contained in the received license issuance request is verified (402).

As explained above, the received license is a license already issued to a document operated in relation to a document to which license issuance is requested from a client PC whose user is a source of the license issuance request.

Subsequently, it is judged whether or not the authenticity of the license is verified by using the method described above (403). If it is not possible to verify the authenticity of the license (403: No), an error process is performed so as to indicate that it is not possible to verify the authenticity of the license (411), and the process is ended.

On the contrary, if the authenticity of the license is verified (403: Yes), a list of license issuable documents shown in the license (e.g., the license issuable contents 21 in the example shown in FIG. 2) is referred to (404). As a result of the reference, it is judged whether or not the document ID of the document that is the target of the license issuance request is specified in the license issuable contents item (405).

If the document ID that is the target of the license issuance request is specified in the license issuable contents item (405: Yes), it is judged that it is possible to issue the license. Accordingly, the piece of policy information corresponding to the request source document for which the license is already issued and another piece of policy information corresponding to the target document ID of the license issuance request are obtained (406). Of these obtained pieces of policy information, the piece of policy information having the higher degree of operation restriction (i.e., having the higher level of security) is selected (407). The contents of the license that are determined based on the contents of the selected piece of policy information are set to the license. Thus, the license is issued to the client PC that is the source of the request (408).

On the contrary, if the document ID that is the target of the license issuance request is not specified in the license issuable contents item (405: No), the piece of policy information corresponding to this document ID is obtained (409), and it is judged whether it is possible to issue the license or not (410). If it is judged that it is possible to issue the license (410: Yes), the contents of the license that are determined based on the contents of the piece of policy information are set to the license, and the license is issued to the client PC that is the source of the request (408). On the other hand, if it is judged that it is not possible to issue the license (410: No), an error process is performed so as to indicate that it is not possible to issue the license (411), and the process is ended.

It should be noted that, in the process described above, description is made of a case where, when the document ID of the target document of the license issuance request is specified in the license issuable content of the license, of the piece of policy information corresponding to the request source document for which the license is already issued and the piece of policy information corresponding to the document ID being the target of the license issuance request, the piece of policy information having the higher degree of operation restriction (i.e., having the higher level of security) is selected. However, it may be possible to select the piece of policy information having the lower degree of operation restriction. Furthermore, it may also be possible to select the piece of policy information corresponding to the request source document for which the license is already. It may be possible to determine, as necessary, which piece of policy information should be selected in accordance with the situation.

In the explanation above, description is made of the process that is performed when a license issuance request is accompanied by a license. However, there is a possibility that a license issuance request may be made without a license for a predetermined document. In this situation, it may be possible to judge whether or not the license is issuable, or to judge details of issuance for issuing the license, based on the policy information corresponding to the document ID of the document. Additionally, it may also be possible to issue the license based on the same judgment as the case where the license is included in the license issuance request as described above, provided that there exists a valid license corresponding to a license requested by the user who is a source of the license issuance request among the licenses issued in the past and stored in the information storing unit 14, and that the document ID of the target document of the license issuance request this time is included in the license issuable content provided in the license.

SECOND EXAMPLE

Because Second Example is similar to First Example, Second Example will be explained while a focus is placed on the differences. The system configuration in Second Example is the same as the configuration shown in FIG. 1.

Figure 5:
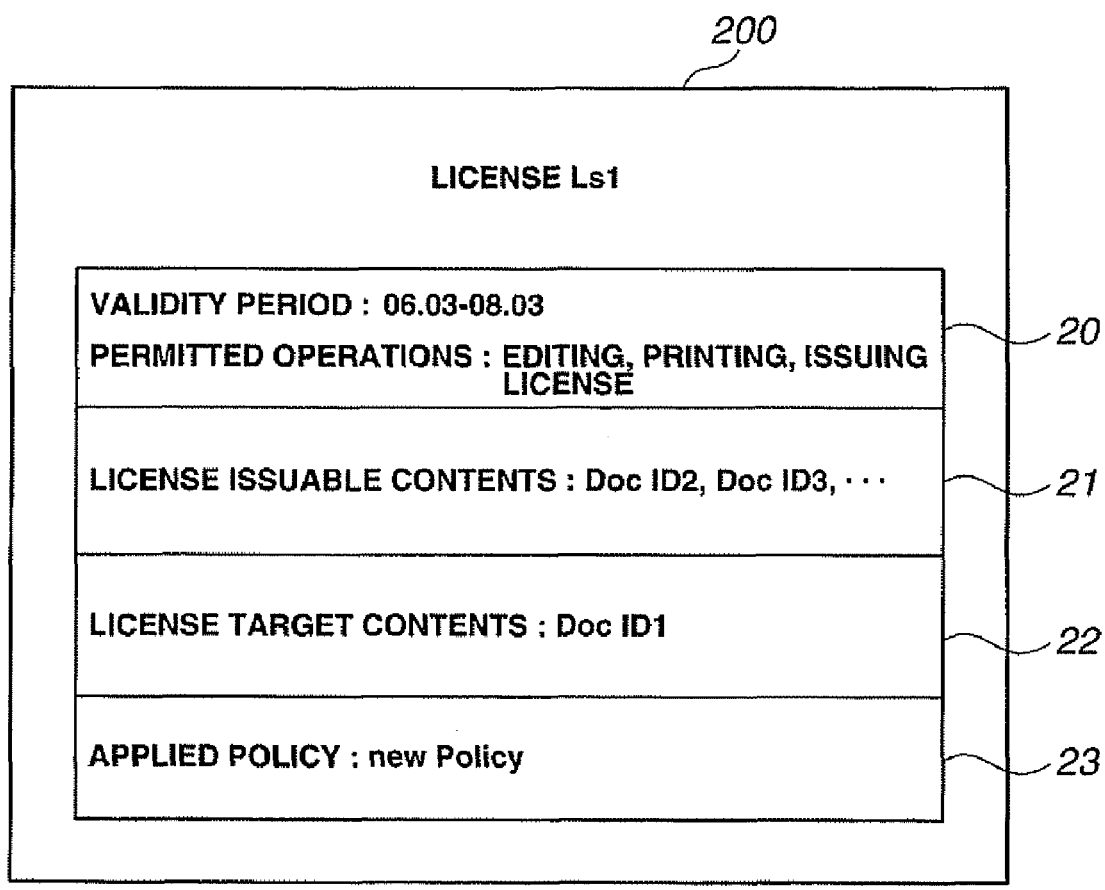
FIG. 5 is a drawing showing another configuration of a license used in the document operating system according to the exemplary embodiment of the present invention.

FIG. 5 is a drawing that shows a configuration of a license used in the document operating system according to the exemplary embodiment of the present invention.

The configuration of the license shown in FIG. 5 is similar to the configuration shown in FIG. 2. For the same elements as those in FIG. 2, the same reference numerals are used. The license shown in FIG. 5 includes the operation information 20 that is made up of the validity period item and the permitted operation item; the license issuable contents item 21; the license target contents item 22 that indicates the document that is the target of the license; and an applied policy item 23.

The configuration shown in FIG. 5 is obtained by adding the applied policy item 23 to the configuration shown in FIG. 2. The applied policy item 23 is an item that specifies a piece of policy information that is referred to when the processing server 100 determines the contents of the license to be issued.

In the applied policy item 23 shown in FIG. 5, "new Policy" is specified. Thus, the piece of policy information indicated as "new Policy" is used for determining the contents of the license to be issued. The contents of "newPolicy" include, at least, the operations permitted for the document and a validity period, which are provided in the license target contents item 22.

Figure 6:
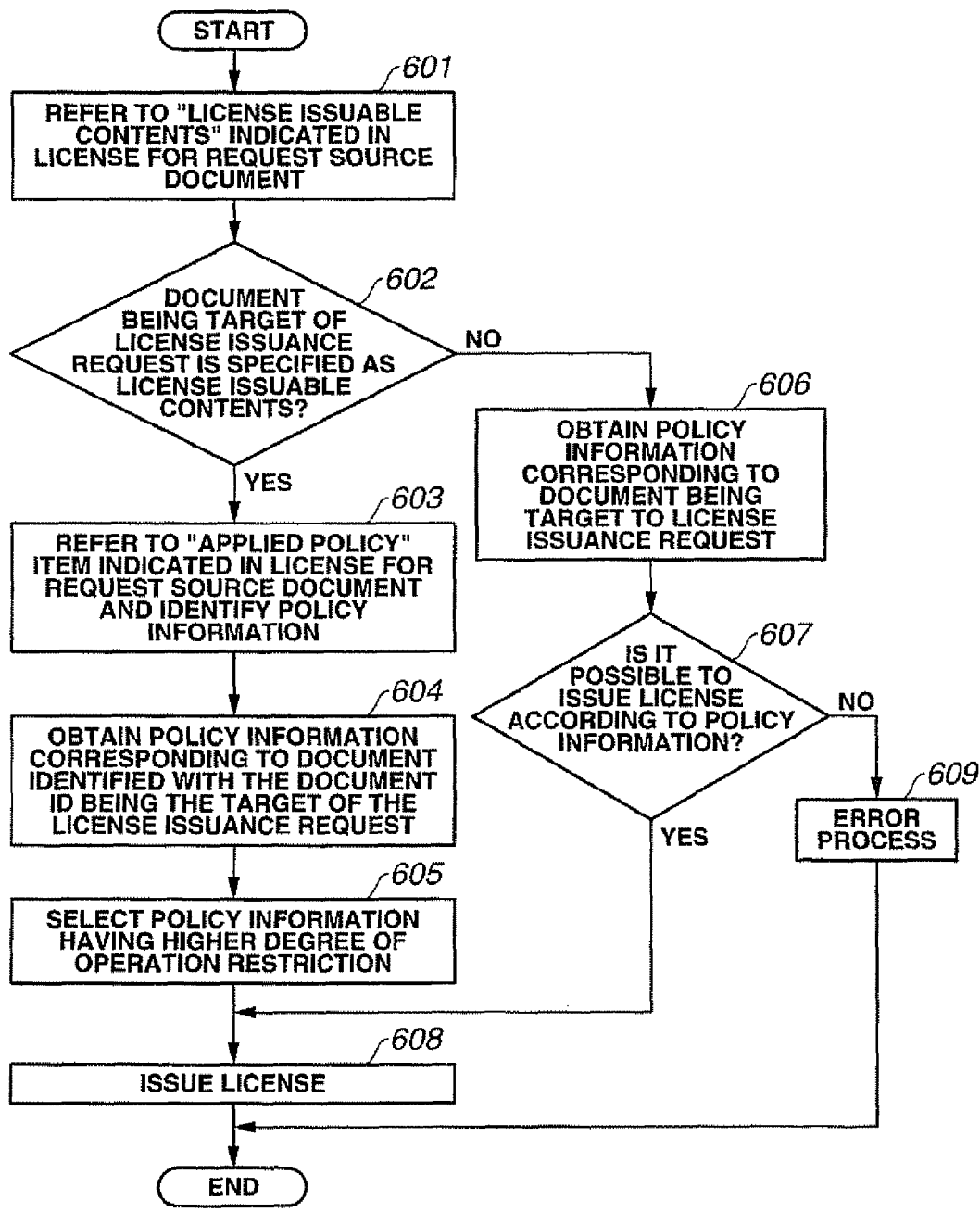
FIG. 6 is a flowchart showing an example of a detailed flow in a license issuability judging process.

FIG. 6 shows a detailed flow in a license issuing process performed by using the piece of policy information "new Policy".

As shown in FIG. 6, when authenticity of the license contained in the license issuance request received from a client PC is verified, the process is started. It should be noted that the authenticity verifying process is performed in the same manner as explained in the description of First Example. After the authenticity is verified, a list of license issuable documents shown in the license (e.g., the license issuable contents 21 in the example shown in FIG. 5) is referred to (601).

By referring to the list of documents, it is judged whether or not the document ID of the target document of the license issuance request is specified in the license issuable contents item (602).

If the document ID that is the target of the license issuance request is specified in the license issuable contents item (602: Yes), it is judged that it is possible to issue the license. Accordingly, the piece of policy information to be applied to the document (e.g., the applied policy item 23 in the example shown in FIG. 5) that is specified in the license is identified (603). Further, the piece of policy information corresponding to the document identified with the document ID that is the target of the license issuance request is obtained (604). In a case of the license shown in FIG. 5, since "new Policy" is specified in the applied policy item 23, this piece of policy information is identified.

Of the obtained policy information and the identified policy information, the policy information having the higher degree of operation restriction (i.e., having the higher level of security) is selected (605). The contents of the license that are determined based on the contents of the selected piece of policy information are set into the license. Then, the license is issued to the client PC that requests the license issuance (608).

On the other hand, if the document ID of the target document of the license issuance request is not provided in the license issuable contents item (602: No), policy information corresponding to the document ID of the document is obtained (606), and it is judged whether it is possible to issue the license or not (607). If it is judged that it is possible to issue the license (607: Yes), the contents of the license that are determined based on the piece of policy information are set into the license, and the license is issued to the client PC that requests the license issuance (608). On the other hand, if it is judged that it is not possible to issue the license (607: No), an error process is performed so as to indicate that it is not possible to issue the license (609), and the process is ended.

It should be noted that it may be possible to employ a configuration as shown in FIG. 7 in which the processing server 100 specifies, in advance, pieces of policy information each of which corresponds to a different one of the documents in the case where license issuance is requested, instead of employing a configuration as shown in FIG. 5 in which the piece of policy information to be applied to the document is specified in the license.

FIG. 7 shows another example of a policy setting table stored in the processing server 100. The table is similar to the one shown in FIG. 3 explained in the description of First Example; however, the column of "license issuable document ID" shown in FIG. 3 is not necessary in Second Example and is therefore omitted.

The policy setting table shown in FIG. 7 is formed by the [policy ID] item 301, the [document ID] item 302, the [use range] item 303, the [validity period] item 304, and the [permitted operation functions] item 305. In the last line, the table contains "Policy X" as the [policy ID] item 301, "temporary" as the [document ID] item 302, "all users" as the [use range] item 303, "unlimited" as the [validity period] item 304, and "viewing" as the [permitted operation functions] item 305.

It means that the document for which the license issuance is requested is identified with "temporary" and that the piece of policy information applied to the document is "Policy X".

In other words, it means that the piece of policy information identified in the process at step 603 in the flowchart shown in FIG. 6 is "Policy X". The process of issuing the license is performed in the same manner as shown in the flowchart in FIG. 6.

It should be noted that, in Second Example, in correspondence with the piece of policy information identified with the policy ID "PolicyX", the use range is specified as "all users"; the validity period is specified as "unlimited"; and the permitted operation function is specified as "viewing". However, it may be possible to set the contents of each of the items in an arbitrary manner.

In the process above, it is described as an example that, if the document ID of the target document of the license issuance request is specified in the license issuable contents of the license, the piece of policy information having the higher degree of operation restriction (i.e., having the higher level of security) is selected from the piece of policy information corresponding to the request source document for which the license is already issued and the piece of policy information corresponding to the document ID that is the target of the license issuance request. However, it may be possible to select the piece of policy information having the lower degree of operation restriction, or to select the piece of policy information of the document that requests the license and to which the license is set. It may be possible to make the determination as necessary in accordance with the situation.

In the present invention, it may be possible to configure the document operating system that implements the processes as described above, by storing in a recording medium (CD-ROM, DVD-ROM and so on) a program for implementing the operations as described above or for configuring the means as described above in the document operating system having a communication function; installing the program to a computer; and causing the computer to execute the program. In the computer that structures the document operating system, a CPU (Central Processing Unit), a ROM (Read-Only Memory), a RAM (Random Access Memory), and a hard disk are connected to each other via a system bus. The CPU performs the processes according to the program that is stored in the ROM or the hard disk, while using the RAM as a working area.

The medium used for supplying the program may be a communication medium (like a medium that temporarily or fluidly stores therein the program such as a communication line or a communication system). For example, it may be possible to employ a configuration in which the program is posted on an electronic bulletin board (i.e., BBS: Bulletin Board Service) in a communication network, so that the program is distributed via a communication line.

The present invention is not limited to the exemplary embodiments as described above and shown in the drawings. It may be possible to implement the present invention while applying various modifications thereto, as necessary, without departing from the gist of the invention.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
    a receiving unit that is configured to receive first authorization information for a first document previously issued and an issuance request requesting issuance of second authorization information for a second document, the first authorization information containing document identification information identifying at least one document configurable to accept issuance of authorization information;
    a verifying unit that is configured to verify an authenticity of the first authorization information received by the receiving unit;
    a checking unit that is configured to check, upon the verification of the authenticity of the first authorization information, whether document identification information identifying the second document as a document configurable to accept issuance of the authorization information is included in the first authorization information;
    an issuing unit that is configured to issue the second authorization information upon a condition that the document identification information identifying the second document as the document configurable to accept issuance of the authorization information is included in the first authorization information; and
    an operation restriction information managing unit that is configured to manage operation restriction information used for restricting operations on the document in correspondence with the document identification information, wherein
    upon a condition that the document identification information identifying the second document is not included in the first authorization information, it is judged whether the second authorization information has issued, based on the operation restriction information for the second document managed by the operation restriction information managing unit,
    the first authorization information includes operation permissions and validity period permissions, and
    at least one of the above units is embodied in a processor.

2. The management apparatus according to claim 1, further comprising:
    an obtaining unit that is configured to obtain
        the operation restriction information corresponding to the document identification information identifying the first document, and
        another operation restriction information corresponding to the document identification information identifying the second document out of the operation restriction information managing unit, upon a condition that the second authorization information for the second document is to be issued; and
    a selecting unit that is configured to select either operation restriction information having a higher degree of operation restriction or operation restriction information having a lower degree of operation restriction, of pieces of operation restriction information obtained by the obtaining unit, wherein
    the issuing unit determines contents of the second authorization information to be issued, based on the operation restriction information selected by the selecting unit.

3. The management apparatus according to claim 1, wherein
    the operation restriction information managing unit is configured to manage
        the operation restriction information used for restricting operations on the document in correspondence with the document identification information, and
        operation restriction information applied when an issuance request requesting issuance of authorization information is accompanied by another authorization information; and the management apparatus further comprises:
    an obtaining unit that is configured to obtain
        the operation restriction information that is applicable out of the authorization information for the first document, and
        the operation restriction information corresponding to the document identification information identifying the second document out of the operation restriction information managing unit, upon a condition that the second authorization information for the second document is issued; and
    a selecting unit that is configured to select either operation restriction information having a higher degree of operation restriction or operation restriction information having a lower degree of operation restriction, of pieces of the operation restriction information obtained by the obtaining unit, wherein
    the issuing unit determines contents of the second authorization information to be issued, based on the operation restriction information selected by the selecting unit.

4. The management apparatus according to claim 1, wherein
    the issuing unit sets operation restriction information having a same contents as the operation restriction information contained in the first authorization information, into the second authorization information.

5. A management apparatus comprising:
    a receiving unit that is configured to receive first authorization information for a first document previously issued and an issuance request requesting issuance of second authorization information for a second document, the first authorization information containing document identification information identifying at least one document configurable to accept issuance of authorization information, and
    operation restriction information that is applicable to the document identified with the document identification information;

a verifying unit that is configured to verify an authenticity of the first authorization information received by the receiving unit;

a checking unit that is configured to check, upon the verification of the authenticity of the first authorization information, whether document identification information identifying the second document as a document configurable to accept issuance of the authorization information is included in the first authorization information;

an issuing unit that is configured to issue the second authorization information upon a condition that the document identification information identifying the second document as the document configurable to accept issuance of the authorization information is included in the first authorization information; and an operation restriction information managing unit that is configured to manage the operation restriction information used for restricting operations on the document in correspondence with the document identification information, wherein upon a condition that the document identification information identifying the second document is not included in the first authorization information, it is judged whether the second authorization information has issued, based on the operation restriction information for the second document managed by the operation restriction information managing unit, the first authorization information also includes operation permissions and validity period permissions, and at least one of the above units is embodied in a processor.

6. The management apparatus according to claim 5, further comprising:

an obtaining unit that is configured to obtain
the operation restriction information that is applicable out of the authorization information for the first document, and
the operation restriction information corresponding to the document identification information identifying the second document out of the operation restriction information managing unit, upon a condition that the second authorization information for the second document is to be issued; and a selecting unit that is configured to select either operation restriction information having a higher degree of operation restriction or operation restriction information having a lower degree of operation restriction, of pieces of operation restriction information obtained by the obtaining unit, wherein the issuing unit determines contents of the second authorization information to be issued, based on the operation restriction information selected by the selecting unit.

7. The management apparatus according to claim 5, wherein the issuing unit sets operation restriction information having the same contents as the operation restriction information contained in the first authorization information, into the second authorization information.

8. A management method comprising:

receiving first authorization information for an issued first document and an issuance request requesting issuance of second authorization information for a second document, the first authorization information containing document identification information identifying at least one document configurable to accept issuance of authorization information;

verifying an authenticity of the received first authorization information, upon the verification of the authenticity of the first authorization information, checking whether document identification information identifying the second document as a document configurable to accept issuance of the authorization information is included in the first authorization information;

upon a condition that the document identification information identifying the second document as the document configurable to accept issuance of the authorization information is included in the first authorization information, issuing the second authorization information, and managing the operation restriction information used for restricting operations on the document in correspondence with the document identification information, wherein upon a condition that the document identification information identifying the second document is not included in the first authorization information, it is judged whether the second authorization information has issued, based on the operation restriction information for the second document, the first authorization information also includes operation permissions and validity period permissions, and at least one of the above steps is performed by a processor.

9. A non-transitory computer readable recording medium storing a management program that causes a computer to execute a process, the process comprising:

receiving first authorization information for an issued first document and an issuance request requesting issuance of second authorization information for a second document containing document identification information identifying at least one document configurable to accept issuance of authorization information;

verifying an authenticity of the received first authorization information;

upon the verification of the authenticity of the first authorization information, checking whether document identification information identifying the second document as a document configurable to accept issuance of the authorization information is included in the first authorization information;

upon a condition that the document identification information identifying the second document as the document configurable to accept issuance of the authorization information is included in the first authorization information, issuing the second authorization information; and managing the operation restriction information used for restricting operations on the document in correspondence with the document identification information, wherein upon a condition that the document identification information identifying the second document is not included in the first authorization information, it is judged whether the second authorization information has issued, based on the operation restriction information for the second document, and the first authorization information also includes operation permissions and validity period permissions.

* * * * *